Aug. 2, 1927.
F. M. REID
STEERING GEAR FOR TRAILERS
Filed Nov. 4, 1925
1,637,456
4 Sheets-Sheet 3
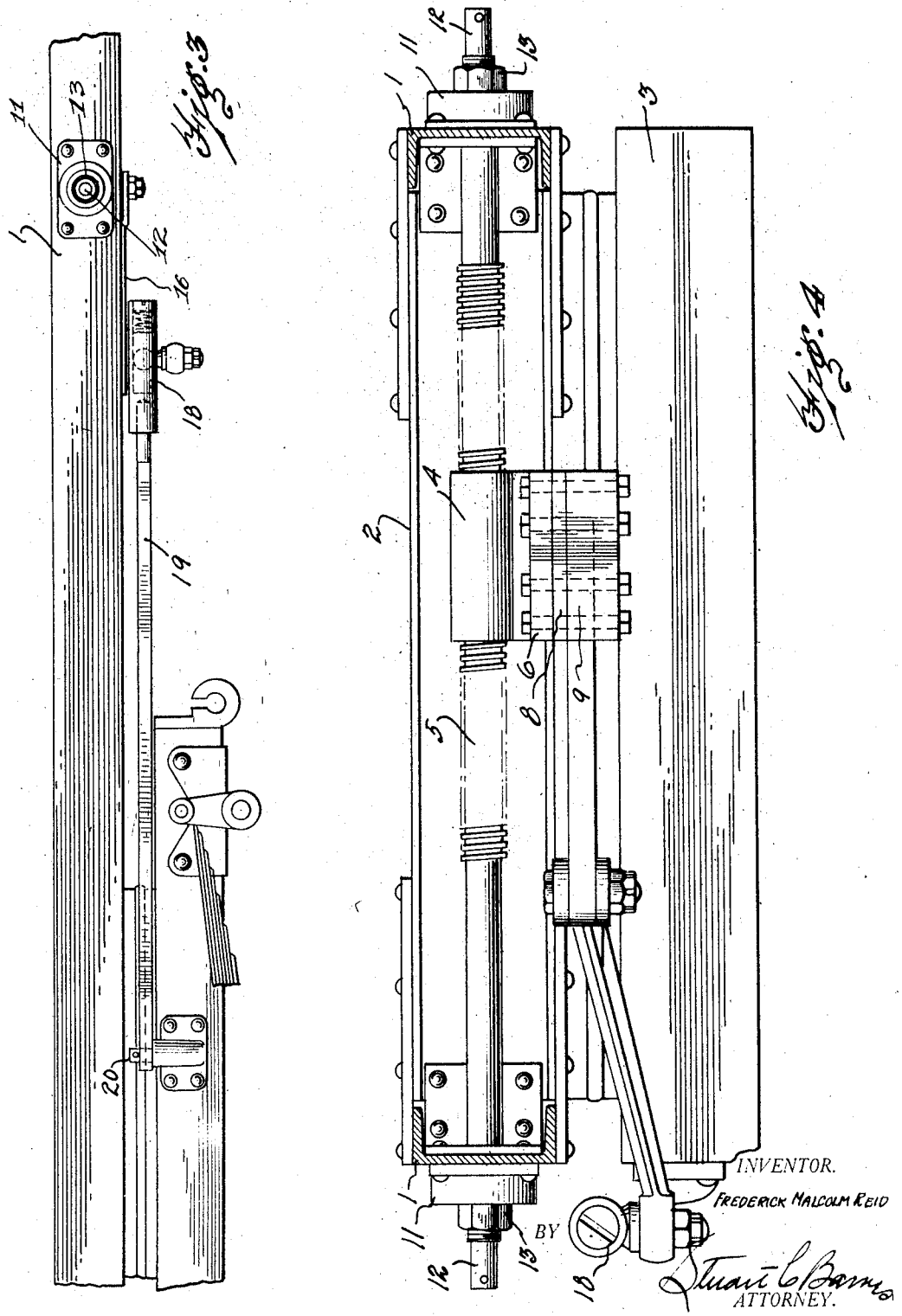
INVENTOR.
FREDERICK MALCOLM REID
BY
ATTORNEY.

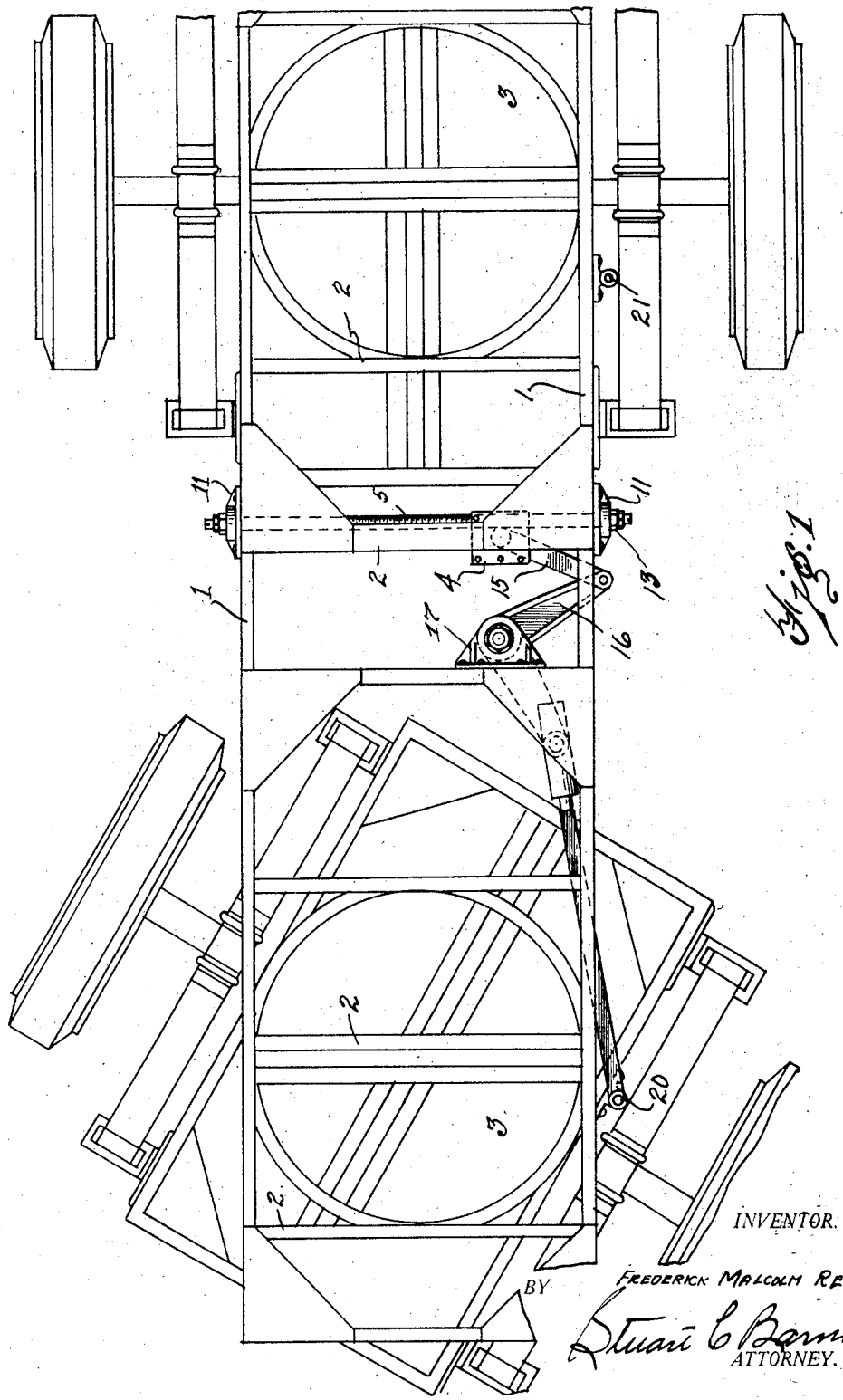

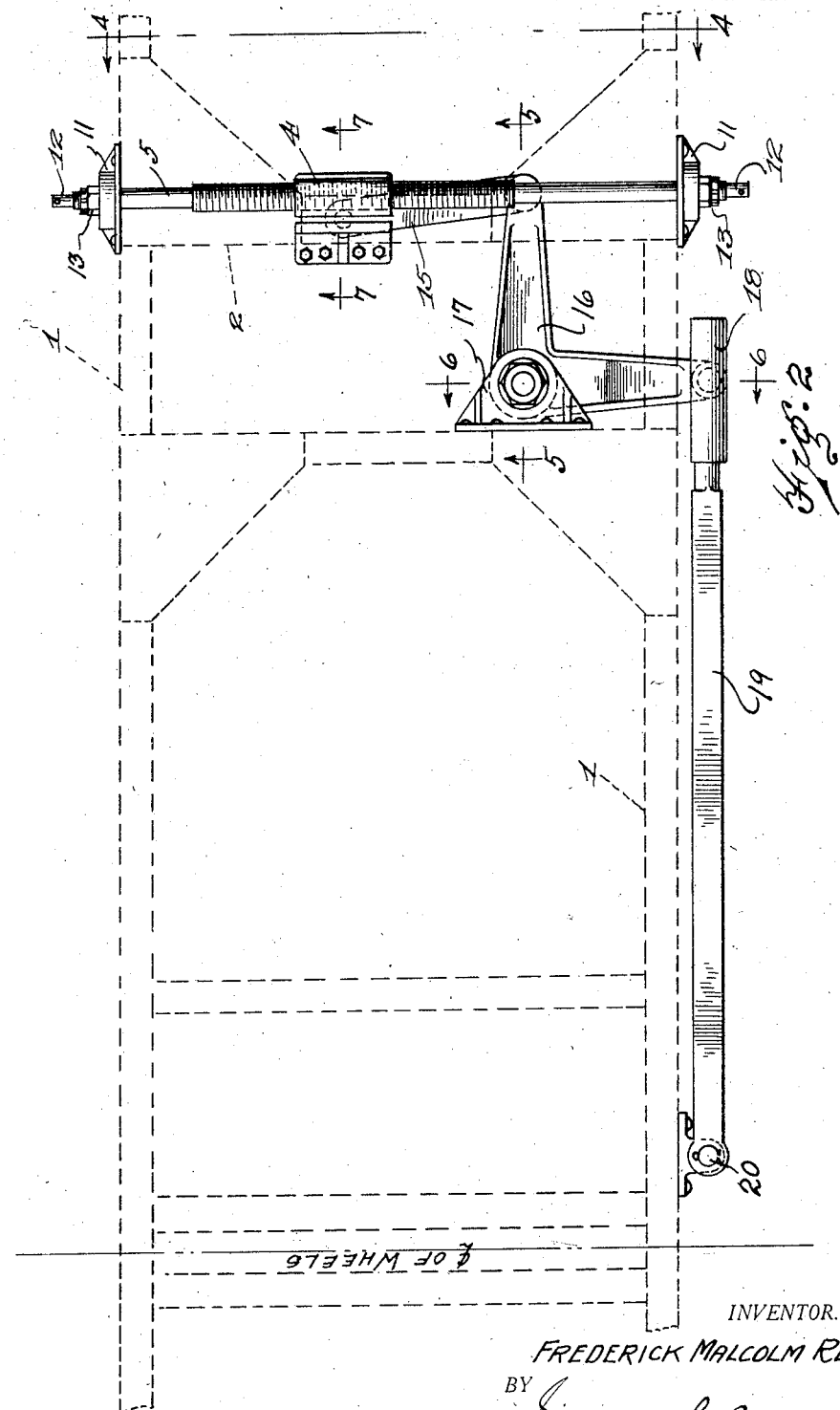

Aug. 2, 1927.

F. M. REID 1,637,456

STEERING GEAR FOR TRAILERS

Filed Nov. 4, 1925

INVENTOR.
FREDERICK MALCOLM REID
BY
Stuart C Barnes
ATTORNEY.

Patented Aug. 2, 1927.

1,637,456

UNITED STATES PATENT OFFICE.

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN.

STEERING GEAR FOR TRAILERS.

Application filed November 4, 1925. Serial No. 66,707.

This invention relates to steering mechanism for vehicles, and particularly to a novel steering mechanism for use with trailer units.

This invention consists in the provision of a very simple and compact steering mechanism which may be quickly and readily attached as a unit to the standard frame or chassis of a trailer without the use of any supporting bars, cross members, or other additional structure. More specifically, my invention relates to a simple steering apparatus which may be applied as a unit to the standard frame of a trailer with no additional structure or work other than the drilling or tapping of a few holes. Furthermore, this invention contemplates the use of means which will not only steer the trailer trucks but which will lock such trucks in any adjusted position.

The many features of this simple and compact device will be apparent as this description progresses, and will be brought out in the claims appended hereto. The various objects of this invention are preferably obtained by the structure illustrated in the drawings wherein similar characters of reference designate corresponding parts, and wherein:

Fig. 1 is a plan view of a trailer structure equipped with my novel steering unit, and showing the steering nut moved to one end of its path to position one of the trailer trucks.

Fig. 2 is a detail plan view, partly diagrammatic, illustrating the manner of connecting and positioning my steering unit relative to the trailer frame.

Fig. 3 is a fragmentary detail side elevation showing a steering link and the manner of connecting the same to the trailer truck and the steering wheel.

Fig. 4 is a vertical sectional view taken on the line 4—4 of Fig. 2, showing the steering nut and operating screw and the manner of connecting the nut and screw to the truck structure.

Figure 5:
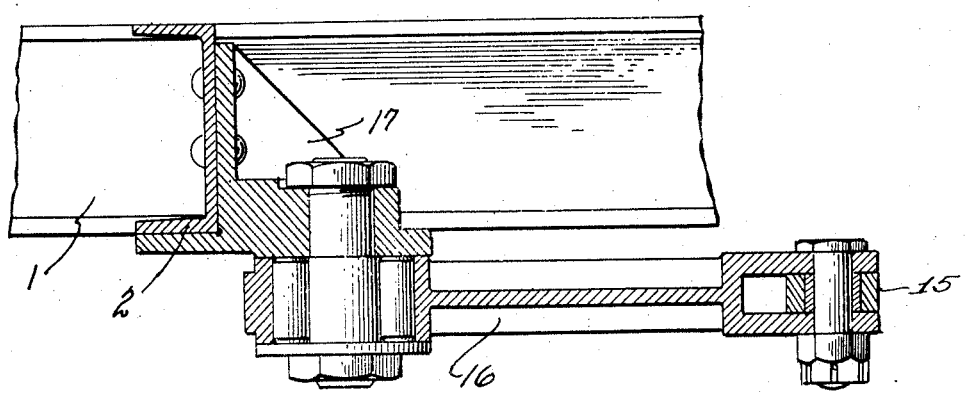
Fig. 5 is a fragmentary detail view taken on the line 5—5 of Fig. 2.

In the drawings I have shown my novel steering unit as being connected or attached to a trailer unit having dead axles and revolvable trucks or fifth wheel structures at either end thereof, although it will be understood that this steering unit may be attached to other vehicles of a similar nature. The chassis of the trailer as illustrated in Fig. 1 consists of the standard side bars 1, together with the cross members 2. Revolvably secured to each end of this trailer frame are the revolvable trucks or fifth wheel structures 3, which may be connected to the frame by king bolts, or other means used in standard construction.

Figure 7:
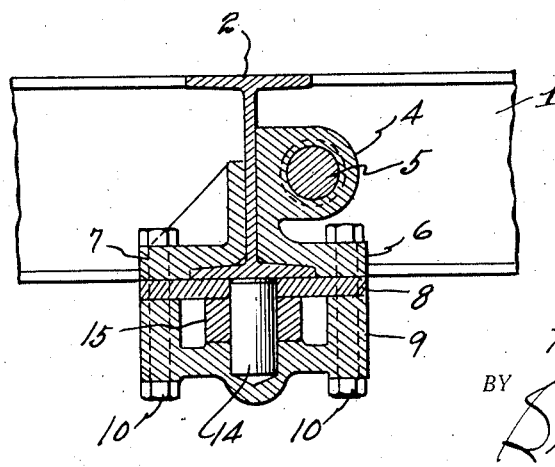
Fig. 7 is a fragmentary detail view taken on the line 7—7 of Fig. 2, showing the general construction of the steering nut and the manner of utilizing the standard cross bar or I-beam of the trailer as a guide for the steering nut.

Designed to be slidably clamped to one of the cross members 2 of the trailer frame, as best shown in Fig. 1, is a steering nut unit 4. This steering nut 4 is threaded to receive a suitable screw 5. This steering nut unit 4 also comprises two oppositely disposed members 6 and 7 which are adapted to fit the inner edges of the flanges of the I-beam 2 and a spacer unit 8, which is adapted to slide against the outer edge of this flange of the I-beam. This unit 4 also comprises a lower member 9 which is adapted to be clamped to the members 6 and 7, and the spacer 8 by means of suitable bolts and nuts 10, as best shown in Fig. 7.

The driving screw 5, which actuates the threaded steering nut 4 extends crosswise of the trailer frame, and parallel to the guiding I-beam 2. This screw 5 extends through the side channels 1 of the frame, and is securely mounted on the frame by suitable bearings 11 mounted on each channel 1, as is best shown in Fig. 1. Each end of this screw shaft 5 terminates in a suitable shoulder 12, and is provided with nuts 13, whereby the shaft 5 may be readily rotated from either side of the trailer by means of suitable cranks.

Figure 6:
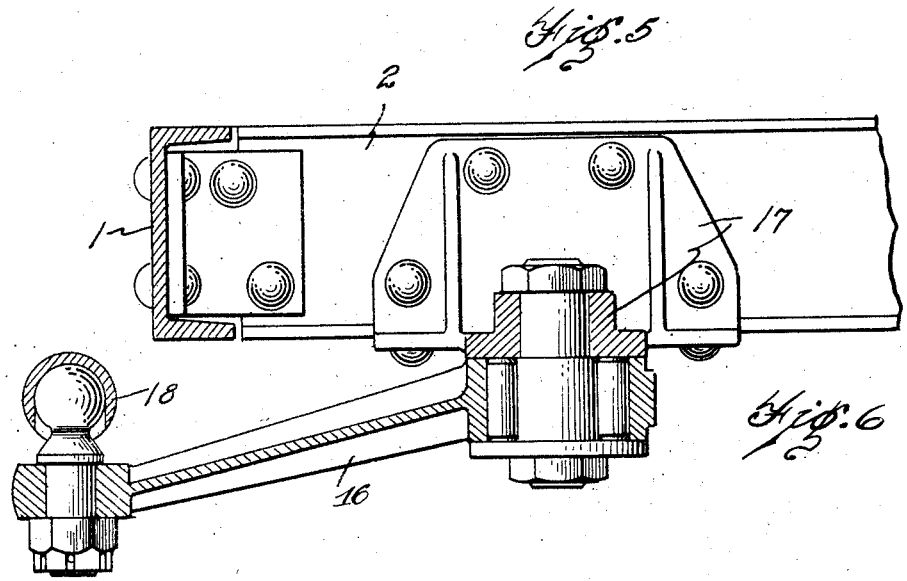
Fig. 6 is a fragmentary detail view taken on the line 6—6 of Fig. 2.

The spacer 8 and element 9 of the nut unit 4 are designed to receive a pin 14, which pin forms a bearing for the link 15. This link 15 is pivotally connected to the outer end of one arm of a bell crank 16, which bell crank is pivotally carried by a supporting unit 17 rigidly secured to one of the cross members 2 of the trailer frame. This supporting unit 17 is best shown in Figs. 2 and 6, and as shown, preferably supports the bell crank slightly below the base of the trailer frame. The other arm of the bell crank 16 is connected at its end in the usual manner to a socket 18, which socket forms one end of a drag or steering link 19. This steering link 19 at its other end is provided with a pin 20 adapted to engage with an aperture 21 in the bracket on the front or rear truck.

In the operation of my device, the steering nut unit 4 may be quickly and easily assembled to embrace the bottom flange of the I-beam 2, as shown in Fig. 1. The channels 2 of the trailer frame having been suitably drilled to receive the screw shaft 5 and the bell crank and supporting hanger clamped to an adjacent cross member 2, it will be obvious that by placing the crank at either end of the shaft 5 and revolving the same, that the steering unit 4 will be reciprocated back and forth along the flange of the cross member or I-beam. This reciprocating of the nut 4 will, through the link 15 and the bell crank 16, cause the connecting unit 18 to be moved in a circle about the fulcrum of the bell crank, whereby the particular truck unit to which the steering link may be connected will be revolved about its vertical axis. The frictional contact between the screw threads of the nut unit 4 and the shaft 5 will permit the locking of the wheels of the trailer truck in any position to which they may be revolved. It will be understood that the connecting member 18 is so connected to the bell crank that the steering link 19 may be readily connected to the steering bracket and aperture 20 of either truck.

It will thus be seen that I have provided a steering mechanism which is extremely simple, compact, and inexpensive to manufacture, and which steering mechanism may be directly connected to the cross members of a trailer frame without the use of any additional parts. It will further be seen that I have also provided a device which utilizes one of the cross members of the trailer frame as a guiding means for the steering member, which makes this device not only very practical but very rugged in construction.

Having thus described my invention, what I claim is:

1. In a steering device for attachment to the frame of a vehicle which has a cross member of I-beam construction, a steering unit carried by the frame and including a pair of members for engagement with opposite sides of the web of the I-beam, and means for holding the members in position consisting of a plate connecting the two members and engaging under the flange of the I-beam means for reciprocating the unit, and means connecting the unit with wheels of the vehicle.

2. In a steering device for attachment to the frame of a vehicle which has a cross member of I-beam construction, a steering unit comprising a pair of members for engagement with opposite sides of the web of the I-beam, and means for holding the members in position consisting of a plate connecting the two members and engaging under the flange of the I-beam, one of the said pair of members being operatively connected to a screw shaft for reciprocating it along the I-beam.

3. In a steering device for attachment to the frame of a vehicle which has a cross member of I-beam construction, a steering unit comprising a pair of members for engagement with opposite sides of the web of the I-beam, means for holding the members in position consisting of a plate connecting the two members and engaging under the flange of the I-beam, one of the said pair of members being operatively connected to a screw shaft for reciprocating it along the I-beam, and means supported by another cross member of the frame for transmitting the motion of the reciprocating member to the wheels of the vehicle.

In testimony whereof I have affixed my signature.

FREDERICK MALCOLM REID.